May 4, 1937.  J. A. LOGAN ET AL  2,079,295
LIQUID DISPENSING APPARATUS
Filed Aug. 27, 1936  3 Sheets-Sheet 1

INVENTOR
JOSEPH A. LOGAN AND
BY WARREN H. DE LANCEY
Chapin + Neal
ATTORNEYS

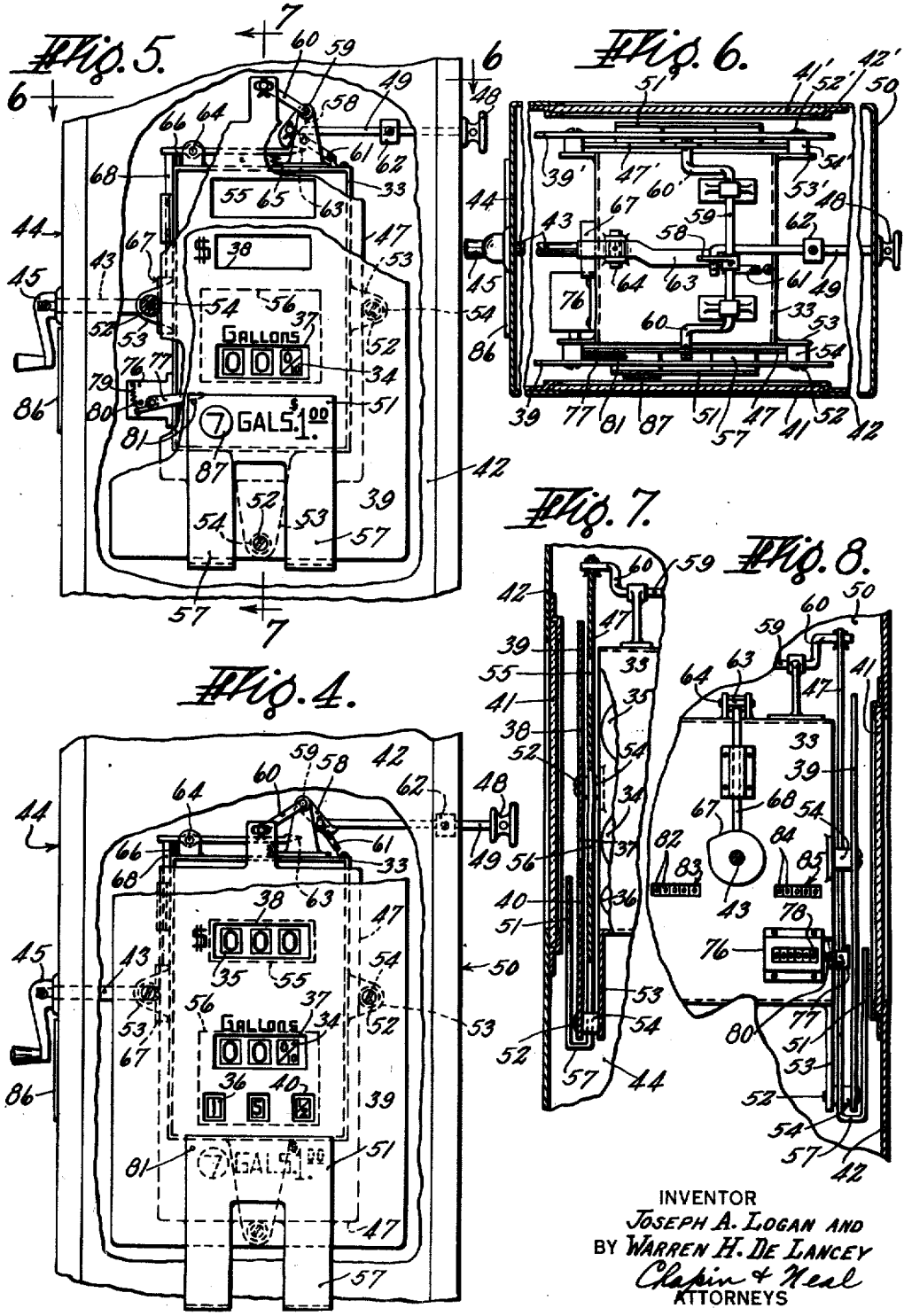

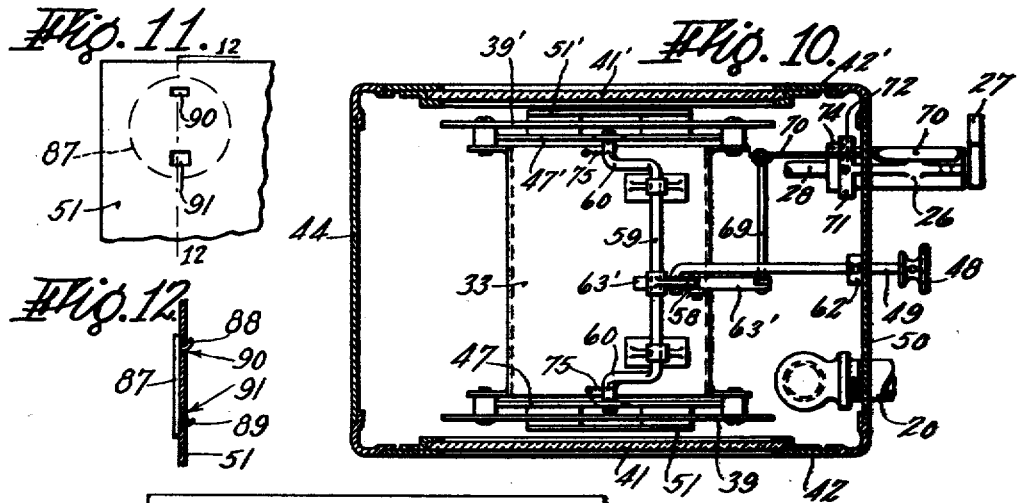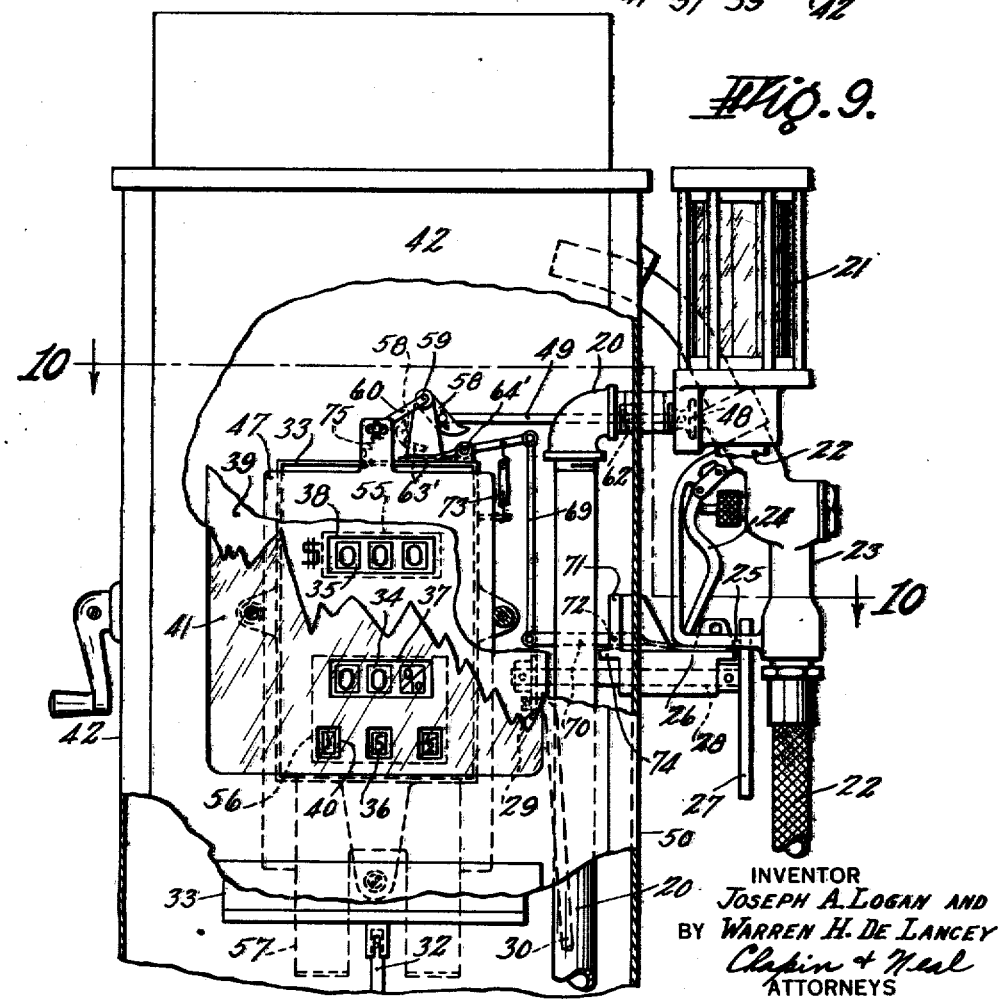

Patented May 4, 1937

2,079,295

UNITED STATES PATENT OFFICE 2,079,295

LIQUID DISPENSING APPARATUS

Joseph A. Logan, Springfield, and Warren H. De Lancey, West Springfield, Mass., assignors to Gilbert & Barker Manufacturing Company, West Springfield, Mass., a corporation of Massachusetts Application August 27, 1936, Serial No. 98,140

18 Claims. (Cl. 221—95)

This invention relates to improvements in liquid dispensing apparatus and more particularly to apparatus of the so-called computing meter pump type, now commonly used for dispensing measured quantities of gasoline and the like.

These pumps are provided with meters which measure the volume of liquid dispensed. The meter has a register with two indicating means, one of which indicates the quantity of liquid dispensed, as in gallons; and the other of which indicates the cost of such quantity, as in dollars and cents. Preferably also, the meter has a third indicating means for displaying the unit price at which the cost is computed. The third indicating means is manually adjustable to change the unit price as required from time to time, and such means is interlocked with the cost indicating means so as to compel a proportionate change in the relationship between the cost and quantity indicating means. The register is also provided with suitable resetting means for returning the cost and quantity indicating means to zero after the completion of each sale, and the resetting means is interlocked with the control member which starts and stops the pump so that the resetting means cannot be actuated while the pump is operating.

These computing pumps have found great favor in the trade and have come into extensive commercial use. However, they are not adapted for one purpose which is often desired by the trade, and that purpose is bargain sales. For example, a station owner may desire to sell seven gallons, or some other quantity, for one dollar. In such case the price per gallon of the bargain quantity will, of course, be less than the unit price displayed on the third indicating means of the register and the cost indicating means will show a total cost in excess of that advertised on the bargain sale.

This invention is directed to improvements which will adapt the regular type of computer pump for the bargain sale use, whenever desired—the improvements enabling a quick change from the standard use to this special use and vice versa.

According to one feature of this invention, means are provided for covering the cost portion of the register whenever the pump is to be used for bargain sale use, and such means are movable into the covering position at the will and under the control of the operator but movable out of such position only after the sale has been completed and the desired quantity has been delivered. Also, means are provided to count the number of times the covering means are moved into or out of covering position.

According to another feature of the invention, the covering means also covers the unit price indicator of the register at the same time that the cost indicating means is covered and the covering means preferably also serves as a sign to display the terms of the bargain sale, whenever it is moved into covering position.

According to another feature of the invention, the movement of the covering means out of covering position is controlled by the means for resetting the register, whereby the restoration of the quantity indicating means to zero restores the register into condition for normal use.

According to another feature of the invention, the movement of the covering means out of covering position is controlled by the hanging up of the hose nozzle of the pump.

Other features of the invention will appear as the detailed description proceeds and will be pointed out in the appended claims.

The invention will be disclosed for illustrative purposes in the accompanying drawings, in which:

Figs. 4 and 5 are views taken similarly to Figs. 2 and 3, respectively, but with parts broken away to reveal interior construction;

Figs. 6 and 7 are sectional views taken on the lines 6—6 and 7—7, respectively, of Fig. 5;

Fig. 8 is a fragmentary elevational view taken from the left side of Fig. 5, certain parts of the pump housing being broken away to reveal interior parts;

Fig. 9 is a fragmentary exterior elevational view of the pump showing a modification;

Fig. 10 is a sectional plan view taken on the line 10—10 of Fig. 9;

Fig. 11 is a fragmentary elevational view, showing a removable numeral-bearing part; and Fig. 12 is a sectional view taken on the line 12—12 of Fig. 11.

Figure 1:
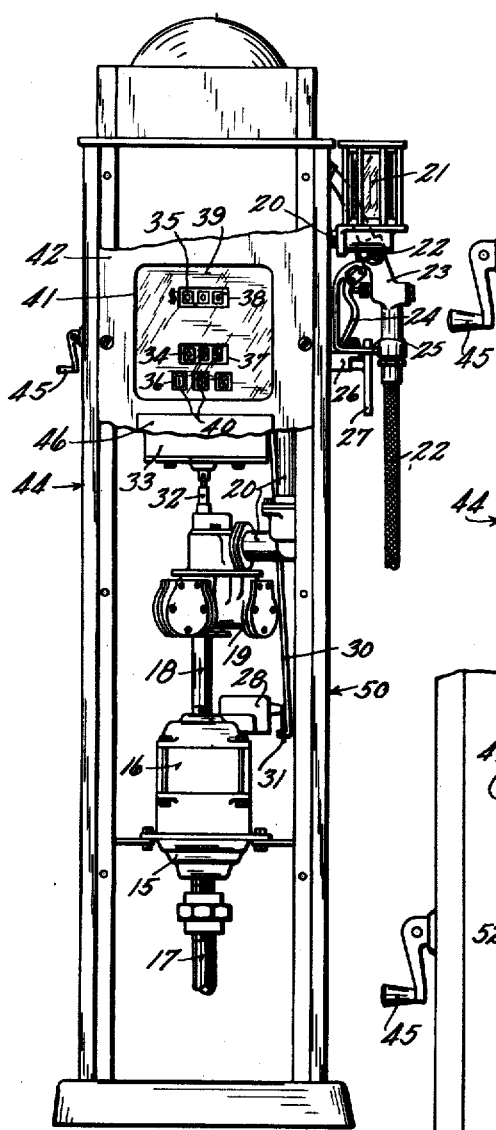
Fig. 1 is a small scale elevational view, partly in section, of a computing type meter pump embodying the invention.
Figure 3:
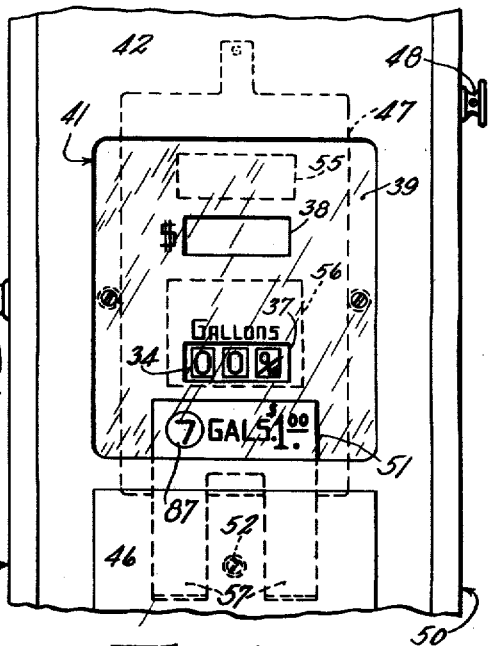
Figs. 2 and 3 are fragmentary exterior elevational views, drawn to a larger scale and showing the exterior face of the register as it appears to the customer when conditioned, respectively, for the normal and for the special use.

Referring to these drawings and first to Fig. 1 thereof, the computer pump, therein shown, embodies a suitable pump 15 suitably driven as by an electric motor 16. Pump 15 draws gasoline up from an underground tank (not shown) through a suction pipe, shown in part at 17, and forces such gasoline up through a pipe 18 to a suitable meter 19. Gasoline leaves the meter by way of a delivery conduit which in this case includes a pipe 20, visible discharge indicator 21 and hose 22. The hose carries on its free end the usual nozzle 23 having a spring closed valve which can be opened manually by pressure on the hand lever 24 and having also a guard 25 for lever 24. The nozzle, when not in use, is hung up by resting the guard 25 on a fixed hose support 26. Adjacent support 26 is a lever 27 for operating the switch 28 of motor 16. The lever is fixed to the outer end of a shaft 28 (see Fig. 9) and the inner end of the shaft carries an arm 29 which is connected by a link 30 (Fig. 1) to the lever 31 of switch 28. The arrangement is such that lever 27 is held against movement and in position to open switch 28 by the guard 25 of the hose nozzle when the latter is in place on support 26. Removal of the nozzle allows lever 27 to move into position to close switch 28 and, when in this position, lever 27 interferes with the placing of the nozzle on the support, whereby the lever must be moved to switch opening position before nozzle 23 can be hung up on support 26. The hose 22 has been broken away to show the hose nozzle but it will be understood that the two portions of the hose, shown in Fig. 1, are interconnected in the usual way. The nozzle 23, hose 22, hose support 26, lever 27 and visible discharge indicator 21 have been omitted in Figs. 2 to 8 to avoid complicating the illustration.

The meter 19 drives through a shaft 32 registering means which are contained in a box-like casing 33. Such means has dial wheels 34 for indicating in gallons and fractions thereof the quantity of liquid delivered through the meter and other dial wheels 35 for indicating in dollars and cents the cost of such quantity as computed from a unit price displayed in cents and fractions thereof on dial wheels 36. The indications of wheels 34 and 35 are visible through openings 37 and 38, respectively, in a dial plate 39 fixed to one face of casing 33, while the dial wheels 36 are visible through individual openings 40. The dial plate 39 is visible through a window 41 provided in one of the removable panels 42 of the pump casing which houses the motor, pump, meter, register and piping, as indicated, and from which said elements are suitably supported.

It is usual to duplicate the described indicating means on the opposite face of the pump and in Fig. 6 there are shown certain of the duplicate parts, such as dial plate 39', window 41' and panel 42'.

The register also has a suitable resetting means, operable by the shaft 43 which extends outside the pump casing, through the panel 44 and has fixed to its outer end a crank handle 45. One complete revolution of this handle 45 will cause all the dial wheels 34 and 35 to be reset to zero.

It will be understood that here, as is usual in computer pumps, this resetting shaft is interlocked with the pump control lever 27 so as to compel alternate operations of the same so that the register cannot be reset while the pump is being operated, and the pump cannot be operated while the register is being reset. It has not been thought necessary to illustrate and describe this interlock as it is a common part of the usual computer pump and well understood by those skilled in the art.

The register 33 is a standard unit available in the market and well known to those skilled in this art. Hence, it will not be necessary to describe in detail its construction. It will suffice to state that within the casing 33 there is a variable speed transmission through which the cost dials 35 are driven from the quantity dials 34. Also, there are means in casing 33 for shifting the transmission to change the speed of the cost dials with respect to that of the quantity dials so that the cost may be computed at various unit prices. Preferably too, there are means for automatically changing the dials 36, operable by a change in speed ratio between the dials 34 and 35, so that the dials 36 will always display the correct unit price and a multiplication of the number of gallons as shown by dial wheels 34, by the unit price displayed by dial wheels 36, will result in the cost shown by dial wheels 35. The shifting mechanism is contained in the lower part of casing 33 and access thereto may be had through a small door 46 in panel 42 without removing the panel.

The pump described is given merely as one illustrative example of a suitable type in which the invention may be embodied, and to show a background or setting for the invention. Obviously, the particular details of the pump apparatus and its constituent elements are not essential to the invention and may be varied as necessary or desired.

Figure 2:
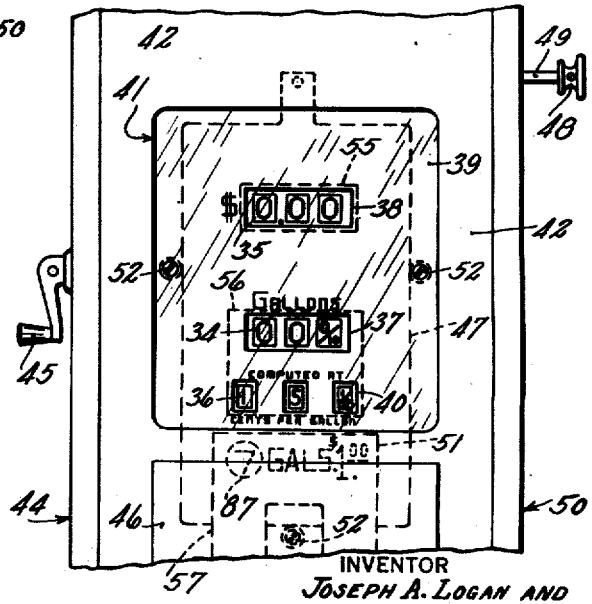

This invention provides a covering means in the nature of a shutter 47 which is normally positioned as shown in Fig. 2, so that the dial wheels 34, 35 and 36 are visible through their respective openings in the dial plate 39 in the usual manner. This shutter may be moved, under manual control (by pressure on a button 48 fixed to a rod 49 mounted in an end panel 50 of the pump housing) into the position shown in Fig. 3, wherein the cost dial wheels 35 and the unit price dials 36 are covered, leaving visible only the quantity dial wheels 34. In addition, the shutter part 51 which covers the dial wheels 36 is preferably arranged as shown to move outside the dial plate 39 instead of inside, as in the case of the part which covers dial wheels 35. This part 51 bears a sign such as one in the nature of that shown, which advertises the bargain sale and offers a specified number of gallons for a stated price, as one dollar. The unit price of the bargain sale is naturally less than that displayed by dial wheels 36 and it is therefore important to cover wheels 36 and it is obviously desirable to replace the unit price display of wheels 36 by a display of the terms of the bargain sale.

Referring to Figs. 4 to 7, the dial plate 39 is secured at three points by screws 52 which thread into lugs 53 on casing 33. These screws pass through sleeves 54 which space the dial plate from the casing far enough to slidably receive the shutter 47. The vertical sides of part 47 engage the two horizontally-opposed sleeves 54 while the lower sleeve serves as a stop to be engaged by the lower edge of the shutter to limit its downward movement, as shown in Fig. 4. The shutter 47 has an upper opening 55 which registers with the opening 38 when the shutter is in its lowered position. When the shutter is raised, as shown in Fig. 7, a portion of it moves in front of the dial wheels 35 and in back of opening 38 to conceal said wheels from view. The shutter has a lower opening 56 which is large enough and so located as to enable wheels 34 to be visible at all positions of shutter 47. This opening 56 also enables the dial wheels 36 to be seen when the shutter is in its lower position but when the shutter is raised, it closes the openings 40, as shown in Fig. 7. These openings are also closed by the sign part 51, which lies outside the dial plate 39 and is suitably connected to the shutter 47. In this case, two U-shaped webs 57 extend from part 51 downwardly around the lower edge of the dial plate 39 and thence upwardly to the shutter and form an integral connection between the parts 47 and 51.

A similar arrangement may be and usually is provided for use with the dial plate 39' of the register as indicated in Fig. 6, in which parts which correspond with those described have been given the same reference numerals with the addition of a prime. In the following description, reference will be made for the most part to one shutter only but it will be understood that two shutters may be used when desired.

Both shutters 47 and 47' are operated from the push rod 49. This rod (Fig. 6) is connected to an arm 58 fixed to a shaft 59, supported as indicated in bearings on the top of casing 33. On the ends of this shaft are cranks 60 and 60', the crank pins of which engage in slots in the upper ends of shutters 47 and 47', respectively. A spring 61 acts on rod 49 to yieldingly hold it in its outwardly extended position shown in Fig. 4 and to hold shutter 47 in its lowermost position. A collar 62 on rod 49 is adapted to engage panel 50 and limit the extent of outward movement of rod 49. By pushing in on rod 49 by means of the button 48, the shutter 47 will be raised from the position of Figs. 2 and 4 to that of Figs. 3, 5 and 7. When the shutter is fully elevated, the lower end of arm 58 will be engaged and held by a latch 63, pivoted at 64 to the top of casing 33. A spring 65 tends to raise the latch to the limit permitted by a stop 66 on the top wall of casing 33.

The shutter, thus raised manually or under manual control, becomes automatically held in its raised position. When the holding latch, such as 63, is released, the shutter will be lowered automatically by its own weight and by the pull of spring 61. The release of this latch may be effected in various ways but preferably by some member which forms a part of the normal control for the apparatus and which has to be actuated by the operator between successive sales, either at the end of one sale or the begninning of the next sale.

One desirable control member of the class just described is the register resetting shaft 43, operated by the crank handle 45. The dial wheels of the register must be restored to zero between successive sales and in the apparatus described, the only way in which this result can be effected is to turn shaft 43 one complete revolution. Also, as heretofore described, this shaft cannot be operated while the pump is being operated so that release of the shutter cannot be effected until pumping ceases and the delivery is completed. On shaft 43 a cam 67 (Fig. 8) is fixed which operates a plunger 68, slidably mounted on one end wall of casing 33, and the upper end of the plunger underlies a part of the latch arm 63. As shaft 43 is turned, cam 67 will raise plunger 68 and cause the latter to engage and release latch 63, whereupon the shutters will move back to their lower positions as described.

Another means for releasing the latch for shutter 47 is shown in Figs. 9 and 10. Here a latch 63' is provided for the same purpose as latch 63. Latch 63' is pivoted at 64' to casing 33 and its outer end is connected by a link 69 to a lever 70. The latter is mounted in a slot in the flange 71 of the hose support 26, being pivoted thereto at 72. A part of lever 70 extends outwardly into overlying relation with hose support 26 and, when the nozzle 23 is removed from its support 26, such part will be elevated by a spring 73 acting between the latch arm 63' and an end wall of casing 33. The lever is limited in the described movement by engagement with a shoulder 74 on member 26. When the nozzle 23 is removed from its support, the spring 73 will raise the latch into position to engage and hold arm 58, if and when the latter is moved as heretofore described by inward pressure on button 48. The release of the latch 63' will be effected when nozzle 23 is replaced on its support, the weight of the nozzle depressing the outer part of lever 70 and causing the latch to be moved out of the path of arm 58. The other parts in Figs. 9 and 10 are the same as heretofore described except that the spring 61 has been replaced by two springs 75 which are each secured at one end to the top of casing 33 and at the other end to the pins of crank 60 or 60' as the case may be. The shutters, however, in construction and operation, are identical with those already described.

This invention also provides means for counting the number of bargain sales. In this case the object is accomplished by counting the number of cycles of operation of the shutter 47. On one end face of the casing 33 is mounted a totalizing register 76 (Figs. 5, 6 and 8) having an actuating lever 77 (Fig. 5) which, when swung in a counterclockwise direction through one tenth of a revolution will actuate the units dial wheel 78 (Fig. 8) of the register one step and, when moved in the opposite direction, does not actuate such dial wheel at all. Registers of this type are too well known in the art to require further description here. The lever 77 is normally held by a spring 79 against a stop 80 (Fig. 8). One end of the lever 77 extends more or less horizontally into the space between the shutter 47 and the dial plate 39 and is located in the path of a pin 81, fixed to the shutter, in such a way that the pin, near the end of the rising movement of the shutter, will engage the lever 76 and move it the required distance. Thus, the number of times the shutter is raised by the operator will be counted and totalized by the register 76.

The casing 33 customarily contains totalizer dials for showing the total quantity and total value of the gasoline sold. These totalizer dials for quantity and cost are shown at 82 and 83, respectively, in Fig. 8, being visible through openings 84 and 85 respectively in the casing 33. Conveniently, the register 76 is located adjacent the totalizers 82 and 83 so that all three may be inspected, when desired, by opening a small door 86 (Figs. 5 and 8) in panel 44.

The member 51 which displays the terms of the bargain sale, preferably has a removable part 87 carrying the numeral, indicating the number of gallons. The part 87 is a disk which is held in place in member 51 in any suitable way to enable it to be conveniently removed and replaced by another disk, bearing a different numeral. As shown in Figs. 11 and 12, the disk has on its rear face a clip 88 and a spring 89 which fit into openings 90 and 91 in the member 51 to detachably hold the disk in position.

For ordinary use, the shutter 47 and its member 51 are in their lowered positions and the dial face of the register appears, as shown in Fig. 2 in the usual way. The quantity and cost dial wheels 34 and 35 are visible through their respective openings 37 and 38 and the openings 40 are uncovered to display the unit price on dial wheels 36. The pump is operated in the usual way after the hose nozzle 23 has been removed from its support 26 to allow the lever 27 to be moved to close the switch of the pump motor 16. The quantity delivered and the cost thereof are shown on dial wheels 34 and 35, respectively, and the indicated quantity and cost are added to the amounts shown by the totalizers 83 and 84, respectively. At the end of each delivery, the operator will hang up the nozzle 23 on support 26 and before he can do so, he must move lever 27 to open the switch of the pump motor. At the same time or at any time before commencing the next delivery, the operator will turn crank 45 one revolution, which will reset the dial wheels 34 and 35 to zero but leave all other dial wheels unaffected.

Whenever it is desired to dispense bargain quantities, the operator pushes button 48 inwardly as far as it will go and this causes the shutter 47 to be raised so as to cover the cost dial wheels 35 and also causes the member 51 to be raised to display the terms of the bargain sale. The latch 63 holds the shutter and member elevated and the totalizer 76 is moved ahead one unit as the result of the elevation of the shutter and member. At the same time, the unit-price dial wheels 36 are concealed by the shutter or the display member 51 or, as shown, by both. The "gallons" dial wheels only are visible to the customer. The pump is then operated in the usual way until the seven gallons or other desired bargain quantity has been dispensed. Then the pump motor is stopped and nozzle 23 is hung up, as before described, after which the register is reset by turning crank 45 one revolution. This resetting operation will result in the release of the latch 63 which holds shutter 47 and member 51 elevated, whereupon the shutter and member will descend to their lowermost positions and the pump will be restored to condition for normal computer service.

The modified arrangement shown in Figs. 9 and 10 is operated in the same way except that the release of latch 63', which holds shutter 47 and member 51 in their elevated positions, is effected automatically by the hanging up of hose nozzle 23, the weight of which depresses lever 70 sufficiently for the purpose. This arrangement has the advantage that the latch may be tripped without resetting the register. A customer may desire twice the bargain quantity and with the prior arrangement, the register would have to be reset in order to drop the shutter 47 so that the counter 76 may be operated by the subsequent raising of it. Otherwise, the counter would not register two bargain sales as it should. This means that the "gallons" dial wheels 34 would be reset to zero so that at the end of a 14 gallon bargain sale, the dial wheels 34 would show 7 instead of 14 gallons. Also, there is generally some interlock which compels stopping of the motor before resetting can be effected. Thus, the first described arrangement is not so well adapted for bargain sale work where multiples of the advertised bargain quantity are desired. With the arrangement shown in Figs. 9 and 10, the operator is not compelled to reset the register or stop the pump. He simply presses down on the exposed end of lever 70 to cause the shutter to drop and then again raises it to actuate counter 76 by pushing in on button 48.

In either form, the cost totalizer 84 will not show correctly the money for which the operator is accountable to the owner of the service station. However, the owner determines from counter 78 how many bargain sales have been made and multiplies that number by seven (in this particular case) to get the total gallonage sold at bargain rates. Then by multiplying this figure by the difference between the normal unit price (shown by dials 36) and the bargain unit price, he obtains the proper figure to deduct from the cost totalizer 84 to determine the money for which the operator is accountable.

The invention offers a simple and relatively inexpensive means applicable to any standard type of computing pump, for enabling the latter to be used, whenever desired, for bargain sale duty.

What we claim is:

1. In a liquid dispensing apparatus, having a meter for measuring the liquid dispensed, a register driven by said meter and having a portion for indicating the quantity of liquid dispensed and a portion for indicating the cost of such quantity, and a manually movable member, actuation of which between successive deliveries of liquid is compulsory; a shutter movable into and out of position in which it conceals the indications of the cost portion of said register, manually operable means controlling the movement of the shutter into said position, releasable means for holding the shutter in said position, means operable by actuation of said member for releasing the shutter holding means, and means for counting the number of times said shutter occupies said position.

2. In a liquid dispensing apparatus, having a meter for measuring the liquid dispensed, a register driven by the meter and having a portion for indicating the quantity of liquid dispensed and a second portion for indicating the cost of such quantity as computed at a certain unit price and having also a display of said unit price, and a manually movable member adapted to be actuated between successive dispensing operations; means movable into position to cover said display and exhibit a bargain quantity and the cost thereof computed at a different unit price, and means operable by the movement of the first named means into said position to render ineffective the cost indications of said register and count the number of said bargain sales.

3. In a liquid dispensing apparatus, having a meter for measuring the liquid dispensed, a register driven by the meter and having a portion for indicating the quantity of liquid dispensed and a second portion for indicating the cost of such quantity as computed at a certain unit price and having also a display of said unit price, and a manually movable member adapted to be actuated between successive dispensing operations; means movable into position to cover said display, said means having on its exposed face a sign offering a bargain quantity at a specified total cost computed at a different unit price, means operable by movement of said means into said position to render the second portion of said register ineffective to indicate costs, and means operable by actuation of said member to move the first named means out of said position and actuate the second named means to render said second portion effective to indicate costs.

4. In a liquid dispensing apparatus, having a meter for measuring the liquid dispensed, a register driven by the meter and having a portion for indicating the quantity of liquid dispensed and a second portion for indicating the cost of such quantity as computed at a certain unit price and having also a display of said unit price, and a manually movable member adapted to be actuated between successive dispensing operations; means movable into position to cover said display, said means having on its exposed face a sign offering a bargain quantity at a specified total cost computed at a different unit price, means operable by movement of said means into said position to render the second portion of said register ineffective to indicate costs, means operable by actuation of said member to move the first named out of said position and actuate the second named means to render said second portion effective to indicate costs, and counting means operable to record the number of times said first-named means occupies said position.

5. In liquid dispensing apparatus, having a meter for measuring the liquid dispensed, a register driven by the meter and having a portion for indicating the quantity of liquid dispensed and another portion for indicating the cost of such quantity, and mechanism for resetting said register, a shutter movable into and out of a position in which it conceals the indications of the cost portion of said register, and manually operable means controlling movement of the shutter into said position, the movement of the shutter out of said position being controlled by said resetting mechanism.

6. In liquid dispensing apparatus, having a meter for measuring the liquid dispensed, a register driven by the meter and having a portion for indicating the quantity of liquid dispensed and another portion for indicating the cost of such quantity, and mechanism for resetting said register, a shutter movable into and out of a position in which it conceals the indications of the cost portion of said register, manually operable means controlling movement of the shutter into said position, latching means for holding the shutter in said position, and means operable by actuation of said resetting means for releasing said latching means.

7. In liquid dispensing apparatus, having a meter for measuring the liquid dispensed, a register driven by the meter and having a portion for indicating the quantity of liquid dispensed and another portion for indicating the cost of such quantity, and mechanism for resetting said register, a shutter movable into and out of a position in which it conceals the indications of the cost portion of said register, manually operable means for moving said shutter into said position, a latch for holding the shutter in said position, means automatically operable on release of said latch to move the shutter out of said position, and means operable by actuation of said resetting mechanism to release said latch.

8. In liquid dispensing apparatus, having a meter for measuring the liquid dispensed, a register driven by the meter and having a portion for indicating the quantity of liquid dispensed and another portion for indicating the cost of such quantity, and mechanism for resetting said register, a shutter movable into and out of a position in which it conceals the indications of the cost portion of said register, manually operable means controlling movement of the shutter into said position, the movement of the shutter out of said position being controlled by said resetting mechanism, and a counter for registering the number of times said shutter is positioned to conceal the cost portion of said register.

9. In liquid dispensing apparatus, having a meter for measuring the liquid dispensed, a register driven by the meter and having a portion for indicating the quantity of liquid dispensed and another portion for indicating the cost of such quantity, and mechanism for resetting said register, a shutter movable into and out of a position in which it conceals the indications of the cost portion of said register, manually operable means controlling movement of the shutter into said position, latching means for holding the shutter in said position, means operable by actuation of said resetting means for releasing said latching means, and a counter for registering the number of times said shutter is positioned to conceal the cost portion of said register.

10. In liquid dispensing apparatus, having a meter for measuring the liquid dispensed, a register driven by the meter and having a portion for indicating the quantity of liquid dispensed and another portion for indicating the cost of such quantity, and mechanism for resetting said register, a shutter movable into and out of a position in which it conceals the indications of the cost portion of said register, manually operable means for moving said shutter into said position, a latch for holding the shutter in said position, means automatically operable on release of said latch to move the shutter out of said position, means operable by actuation of said resetting mechanism to release said latch, and a counter for registering the number of times said shutter is positioned to conceal the cost portion of said register.

11. In a liquid dispensing apparatus, having a meter for measuring the liquid dispensed, a register driven by the meter and having a portion for indicating the quantity of liquid dispensed and a second portion for indicating the cost of such quantity and a third portion for indicating the unit price at which said cost is computed, and mechanism for resetting the register, shutter means movable into and out of a position in which to cover the second and third portions of said register, manually operable means controlling movement of the shutter means into said position, the movement of the shutter out of said position being controlled by said resetting mechanism, and means for registering the number of times said shutter means is positioned to conceal said second and third positions of the register.

12. In a liquid dispensing apparatus, having a meter for measuring the liquid dispensed, a register driven by the meter and having a portion for indicating the quantity of liquid dispensed and a second portion for indicating the cost of such quantity and a third portion for indicating the unit price at which said cost is computed, and mechanism for resetting the register, a shutter movable into and out of position in which it conceals the indications of the cost portion of said register, a second shutter movable into and out of position in which it overlies and conceals the unit price indications of the third portion of said register, said second shutter bearing on its exposed face a sign displaying the cost of a specified quantity computed at a different rate than that indicated by the third portion of the register, manually operable means controlling the movement of said shutters into said position, the movement of said shutters out of said position being controlled by said resetting mechanism, and means for registering the number of times said shutters occupy the stated positions.

13. In liquid dispensing apparatus, a delivery conduit terminating in a flexible hose having on its free end a discharge nozzle, a support on which said nozzle may be hung when not in use, a meter interposed in said conduit, a register driven by the meter and having a portion for indicating the quantity of liquid dispensed and a portion for indicating the cost of such quantity, a shutter movable into and out of a position in which it conceals the indications of the cost portion of said register, manually operable means controlling the movement of the shutter into said position, a counter operable by movement of the shutter and registering the number of times the shutter is positioned to conceal the cost portion of the register, and means engageable by the hose nozzle when placed on said support for controlling the movement of the shutter out of said position.

14. In liquid dispensing apparatus, a delivery conduit terminating in a flexible hose having on its free end a discharge nozzle, a support on which said nozzle may be hung when not in use, a meter interposed in said conduit, a register driven by the meter and having a portion for indicating the quantity of liquid dispensed and a second portion for indicating the cost of such quantity, and a third portion for indicating the unit price at which said cost is computed, shutter means movable into and out of a position in which to cover the second and third portions of said register, manually operable means controlling the movement of the shutter into said position, a counter operable by movement of the shutter and registering the number of times the shutter is positioned to conceal the cost portion of the register, and means engageable by the hose nozzle when placed on said support for controlling the movement of the shutter out of said position.

15. In liquid dispensing apparatus, a delivery conduit terminating in a flexible hose having on its free end a discharge nozzle, a support on which said nozzle may be hung when not in use, a meter interposed in said conduit, a register driven by the meter and having a portion for indicating the quantity of liquid dispensed and a second portion for indicating the cost of such quantity and a third portion for indicating the unit price at which said cost is computed, a shutter movable into and out of a position in which it conceals the indications of the cost portion of said register, a second shutter movable into and out of a position in which it overlies and conceals the third portion of said register, said second shutter bearing on its exposed face a sign displaying the cost of a specified quantity computed at a different rate than that indicated by said third portion, manually operable means controlling the movement of the shutters into said position, a counter operable by movement of the shutters and registering the number of times the shutters are positioned to conceal the cost portion of the register, and means engageable by the hose nozzle when placed on said support for controlling the movement of the shutter out of said position.

16. In liquid dispensing apparatus, having a meter for measuring the liquid dispensed, a register driven by the meter for indicating the quantity of liquid dispensed, a control member actuation of which between successive sales is compulsory, and a device indicating the unit price of the liquid; of a shutter movable into and out of position to cover the indications of said device, said shutter having on its exposed face a sign displaying the cost of a specified quantity of liquid computed at a different unit price, manually operable means controlling the movement of said shutter into said position, means dependent on an actuation of said member for moving said shutter out of said position and counting means for recording the number of times said shutter occupies said position.

17. In liquid dispensing apparatus, having a meter for measuring the liquid dispensed, a register driven by the meter for indicating the quantity of liquid dispensed, means for resetting said register, and a device indicating the unit price of the liquid; of a shutter movable into and out of position to cover the indications of said device, said shutter having on its exposed face a sign displaying the cost of a specified quantity of liquid computed at a different unit price, manually operable means controlling the movement of said shutter into said position, means dependent on an actuation of said resetting means for moving said shutter out of said position and counting means for recording the number of times said shutter occupies said position.

18. In liquid dispensing apparatus, having a delivery conduit terminating in a flexible hose having on its free end a discharge nozzle, a support on which said nozzle may be hung when not in use, a meter interposed in said conduit, a register driven by the meter for indicating the quantity of liquid dispensed, and a device indicating the unit price of the liquid; of a shutter movable into and out of position to cover the indications of said device, said shutter having on its exposed face a sign displaying the cost of a specified quantity of liquid computed at a different unit price, manually operable means controlling the movement of said shutter into said position, means engageable by the hose nozzle when placed on said support for controlling the movement of the shutter out of said position, and counting means for recording the number of times said shutter occupies said position.

JOSEPH A. LOGAN.
WARREN H. DE LANCEY.

CERTIFICATE OF CORRECTION.

Patent No. 2,079,295.   May 4, 1937.

JOSEPH A. LOGAN, ET AL.

It is hereby certified that error appears in the printed specification of the above numbered patent requiring correction as follows: Page 3, first column, line 53, for "begninning" read beginning; and page 5, second column, line 60, claim 11, for "positions" read portions; and that the said Letters Patent should be read with these corrections therein that the same may conform to the record of the case in the Patent Office.
Signed and sealed this 1st day of June, A. D. 1937.

Henry Van Arsdale (Seal)   Acting Commissioner of Patents.